US008732859B2

(12) United States Patent
Hlavac et al.

(10) Patent No.: US 8,732,859 B2
(45) Date of Patent: May 20, 2014

(54) APPARATUS AND METHOD FOR MONITORING NETWORK EQUIPMENT

(75) Inventors: Mark Hlavac, New Lenox, IL (US); William J. Riha, Naperville, IL (US); Jorge A. Avila, Oak Forest, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 771 days.

(21) Appl. No.: 12/244,933

(22) Filed: Oct. 3, 2008

(65) Prior Publication Data

US 2010/0088762 A1 Apr. 8, 2010

(51) Int. Cl.
*G06F 11/00* (2006.01)
*G06F 7/04* (2006.01)
*H04L 9/32* (2006.01)

(52) U.S. Cl.
USPC ................................. 726/34; 726/9; 713/172

(58) Field of Classification Search
USPC .................. 713/159, 183; 726/2–3, 9, 16, 20, 726/34–35
See application file for complete search history.

(56) References Cited

U.S. PATENT DOCUMENTS

| | | | | |
|---|---|---|---|---|
| 5,886,634 | A * | 3/1999 | Muhme ....................... | 340/572.1 |
| 6,232,877 | B1 * | 5/2001 | Ashwin ....................... | 340/572.1 |
| 6,300,872 | B1 * | 10/2001 | Mathias et al. ............... | 340/540 |
| 6,546,491 | B1 * | 4/2003 | Challener et al. .............. | 726/35 |
| 6,725,379 | B1 * | 4/2004 | Dailey ............................ | 726/35 |
| 6,982,656 | B1 * | 1/2006 | Coppinger et al. ........... | 340/988 |
| 7,107,455 | B1 * | 9/2006 | Merkin .......................... | 713/182 |
| 7,388,481 | B1 * | 6/2008 | Cahn ............................. | 340/505 |
| 7,496,948 | B1 * | 2/2009 | Hamilton et al. ................. | 726/1 |
| 2001/0052851 | A1 * | 12/2001 | Mathias et al. ............. | 340/573.1 |
| 2002/0051540 | A1 * | 5/2002 | Glick et al. ..................... | 380/258 |
| 2002/0089434 | A1 * | 7/2002 | Ghazarian ..................... | 340/988 |
| 2002/0108058 | A1 * | 8/2002 | Iwamura ....................... | 713/201 |
| 2002/0116493 | A1 * | 8/2002 | Schenkel et al. .............. | 709/224 |
| 2003/0065934 | A1 * | 4/2003 | Angelo et al. ................. | 713/200 |
| 2003/0069960 | A1 * | 4/2003 | Symons et al. ............... | 709/224 |
| 2003/0204739 | A1 * | 10/2003 | Ng. et al. ....................... | 713/194 |
| 2003/0217137 | A1 * | 11/2003 | Roese et al. ................... | 709/223 |
| 2004/0067750 | A1 * | 4/2004 | Engstrom et al. ............. | 455/411 |
| 2004/0203862 | A1 * | 10/2004 | Wood et al. ................. | 455/456.1 |
| 2004/0236547 | A1 * | 11/2004 | Rappaport et al. ............. | 703/2 |
| 2004/0250074 | A1 * | 12/2004 | Kilian-Kehr .................. | 713/172 |
| 2005/0110638 | A1 * | 5/2005 | Mohr .......................... | 340/572.1 |
| 2005/0110639 | A1 * | 5/2005 | Puzio et al. ................. | 340/572.1 |
| 2005/0138410 | A1 * | 6/2005 | Masuouka et al. ............ | 713/200 |
| 2005/0155069 | A1 * | 7/2005 | LaJoie et al. ..................... | 725/80 |
| 2005/0174238 | A1 | 8/2005 | Foseide | |
| 2005/0200453 | A1 * | 9/2005 | Turner et al. ................. | 340/5.61 |
| 2005/0287986 | A1 * | 12/2005 | Sathe et al. .................... | 455/410 |
| 2006/0224887 | A1 * | 10/2006 | Vesikivi et al. ............... | 713/166 |

(Continued)

FOREIGN PATENT DOCUMENTS

JP 2005011056 1/2005

*Primary Examiner* — Darren B Schwartz
(74) *Attorney, Agent, or Firm* — Guntin & Gust, PLC; Ralph Trementozzi

(57) ABSTRACT

A system that incorporates teachings of the present disclosure may include, for example, a server having a controller to receive a monitoring signal from a network plug-in device where the monitoring signal includes location and identification information associated with the network plug-in device and where the server is remote from the network plug-in device, and determine whether the network plug-in device is in an unauthorized location based at least in part on the monitoring signal. Other embodiments are disclosed.

25 Claims, 5 Drawing Sheets

(56) References Cited

U.S. PATENT DOCUMENTS

| | | | |
|---|---|---|---|
| 2007/0018826 A1* | 1/2007 | Nowak et al. | 340/572.1 |
| 2007/0162954 A1* | 7/2007 | Pela | 726/2 |
| 2007/0164847 A1* | 7/2007 | Crawford et al. | 340/5.61 |
| 2007/0290791 A1* | 12/2007 | Batra | 340/5.31 |
| 2008/0042810 A1* | 2/2008 | Nakane et al. | 340/426.18 |
| 2008/0074265 A1 | 3/2008 | Schoen et al. | |
| 2008/0079580 A1* | 4/2008 | Shelton et al. | 340/572.1 |
| 2008/0157961 A1* | 7/2008 | Park et al. | 340/540 |
| 2008/0256648 A1* | 10/2008 | Piccionelli et al. | 726/35 |
| 2009/0058594 A1* | 3/2009 | Nakagawa et al. | 340/5.7 |
| 2009/0210932 A1* | 8/2009 | Balakrishnan et al. | 726/5 |
| 2009/0249443 A1* | 10/2009 | Fitzgerald et al. | 726/2 |
| 2010/0019905 A1* | 1/2010 | Boddie et al. | 340/572.1 |
| 2010/0102993 A1* | 4/2010 | Johnson | 340/988 |

* cited by examiner

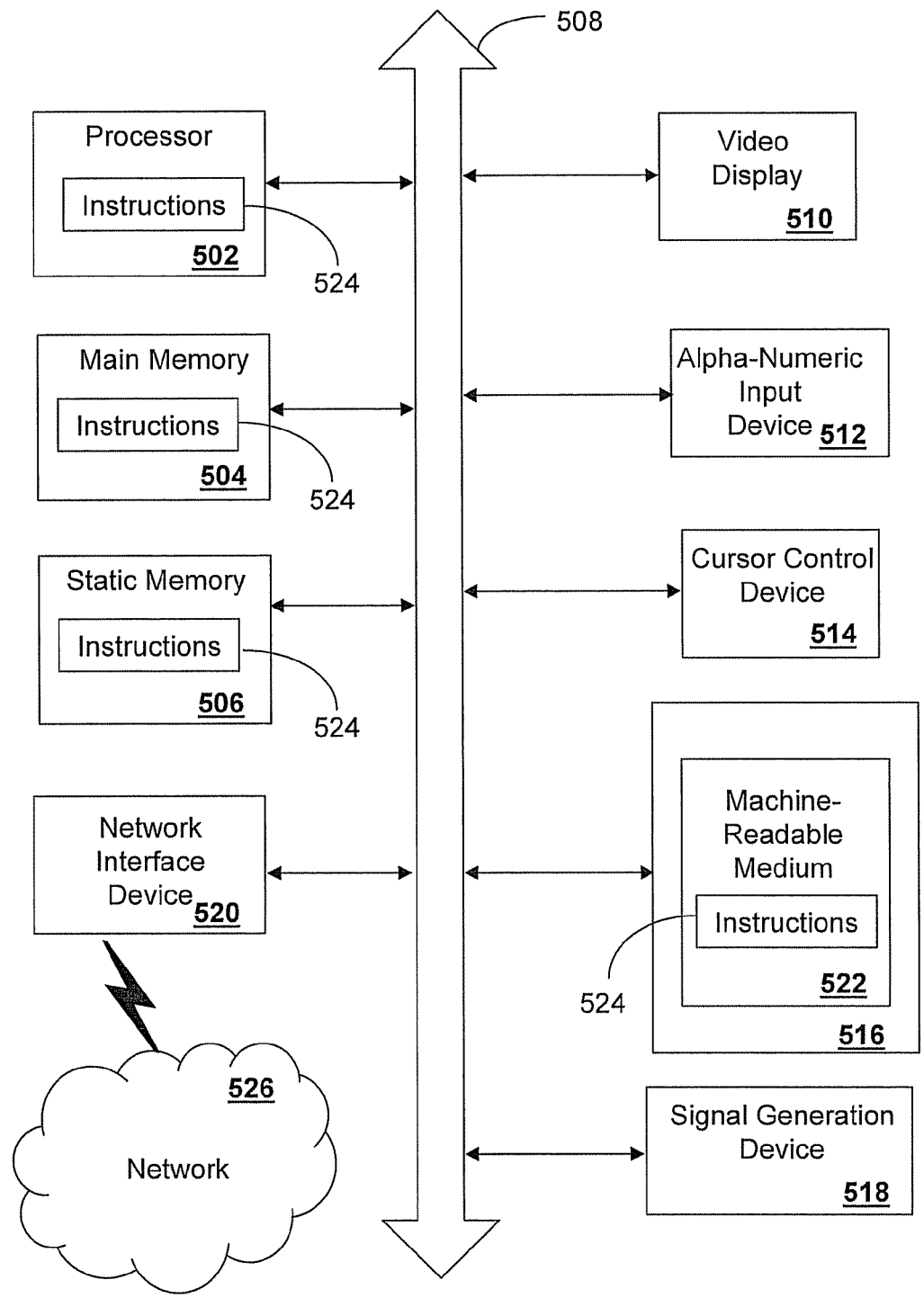
FIG. 5    500

APPARATUS AND METHOD FOR MONITORING NETWORK EQUIPMENT

FIELD OF THE DISCLOSURE

The present disclosure relates generally to network communications and more specifically to an apparatus and method for monitoring network equipment.

BACKGROUND

Networks continue to expand to provide more services and wider coverage areas for users. Network elements, including routers, multiplexers, and the like, can be distributed at various locations throughout the network. The network elements can be added to and removed from the network, including re-distributing the network elements throughout the network.

BRIEF DESCRIPTION OF THE DRAWINGS

FIG. 5 is a diagrammatic representation of a machine in the form of a computer system within which a set of instructions, when executed, may cause the machine to perform any one or more of the methodologies discussed herein.

DETAILED DESCRIPTION

Figure 1:
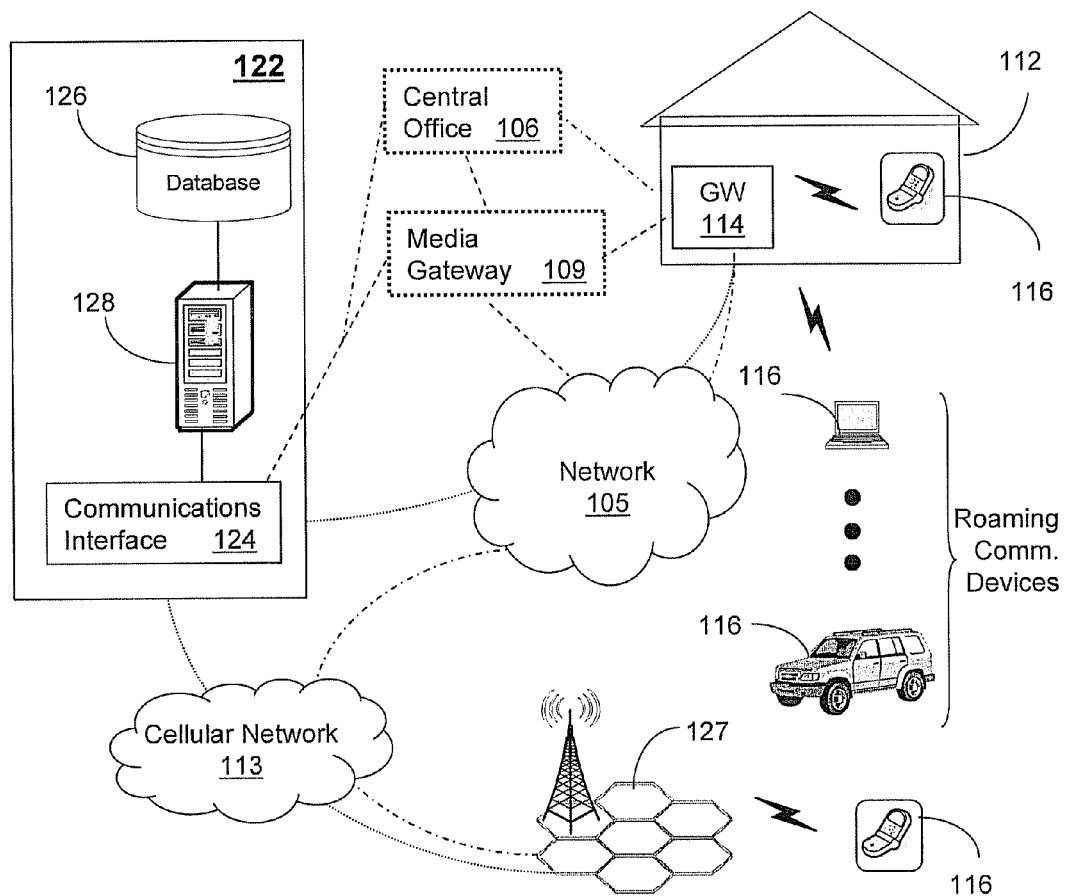
FIG. 1 depicts an illustrative embodiment of a communication system that provides media services.

One embodiment of the present disclosure entails computer-readable storage medium, having computer instructions for receiving an actuation signal at a network plug-in device, obtaining location information associated with the network plug-in device based on receipt of the actuation signal, transmitting a monitoring signal to a remote server from the network plug-in device where the monitoring signal includes the location information and identification information associated with the network plug-in device, and transmitting a security signal when the network plug-in device is within a pre-determined distance of a security device.

Another embodiment of the present disclosure entails a server having a controller to receive a monitoring signal from a network plug-in device where the monitoring signal includes location and identification information associated with the network plug-in device and where the location information is generated by the network plug-in device, receive access information associated with an individual in proximity to the network plug-in device, and determine whether the network plug-in device is in an unauthorized location based at least in part on the monitoring signal and the access information.

Yet another embodiment of the present disclosure entails a server having a controller to receive a monitoring signal from a network plug-in device where the monitoring signal includes location and identification information associated with the network plug-in device and where the server is remote from the network plug-in device and where the network plug-in device is part of a communication link between first and second user devices, and determine whether the network plug-in device is in an unauthorized location based at least in part on the monitoring signal.

Yet another embodiment of the present disclosure entails a network plug-in device having a controller to generate location information associated with the network plug-in device based on receipt of an actuation signal, transmit a monitoring signal to a remote server where the monitoring signal includes the location information and identification information associated with the network plug-in device, and transmit a security signal when the network plug-in device is within a pre-determined distance of a security device.

Yet another embodiment of the present disclosure entails a method including obtaining location information associated with a network plug-in device, transmitting a monitoring signal to a remote server from the network plug-in device where the monitoring signal includes the location information and identification information associated with the network plug-in device, and transmitting to the server at least one of a security signal and access information, where the security signal is transmitted when the network plug-in device is within a pre-determined distance of a security device, and where the access information is associated with an individual in proximity to the network plug-in device.

FIG. 1 depicts an exemplary embodiment of a communication device 116 communicating by way of an access point, such as wireless access points (WAPs) with other communication devices and/or a network proxy or web server 122 which collectively operate in a communication system 100. The communication device 116 can be a multimode VoIP terminal. However, the present disclosure contemplates the use of other types of communication devices, including other types of voice, video and data devices. The communication system 100 can comprise a packet-switched network 105. The packet-switched network can be an Internet Service Provider (ISP) network 105. The network 105 can be coupled to the network proxy 122, the cellular network 113 and network elements located in one or more of the buildings 112 representing an enterprise or residence. The ISP network 105 can utilize common technology for transporting Internet traffic.

In an enterprise setting, the building 112 can include a gateway 114 that provides voice and/or video connectivity services between communication devices 116, such as VoIP terminals or other forms of communication devices of enterprise personnel. In a residential setting, the building 112 can include a gateway 114 represented by, for example, a residential gateway coupled to central office 106 utilizing conventional telephonic switching for processing calls with third parties.

The network proxy 122 can be used to control operations of a media gateway 109, the central office 106 and the gateway 114. Communications between the network proxy 122, the communication devices 116 and other network elements of the communication system 100 can conform to any number of signaling protocols such as a session initiation protocol (SIP), SS7, or a video communications protocol such as H.323 which combines video and voice over a packet-switched network, as well as cryptographic protocols, such as transport layer security (TLS) or secure sockets layer (SSL), to provide secure communications for data transfers.

The network proxy 122 can comprise a communications interface 124 that utilizes common technology for communicating over an IP interface with the network 105, the media gateway 109, the cellular network 113, and/or the gateway 114. By way of the communications interface 124, the network proxy 122 can direct by common means any of the foregoing network elements to establish packet switched data, voice, and/or video connections between communication devices 116 distributed throughout the communication system 100. The network proxy 122 can further comprise a memory 126 (such as a high capacity storage medium) embodied in this illustration as a database, and a controller 128 that makes use of computing technology such as a desktop computer, or scalable server for controlling operations of the network proxy 122. The network proxy 122 can operate as an IP Multimedia Subsystem (IMS) conforming in part to protocols defined by standards bodies such as 3GPP (Third Generation Partnership Protocol).

Under the control of the network proxy 122, the media gateway 109 can link packet-switched and circuit-switched technologies such as the cellular network 113 (or central office 106) and the network 105, such as an ISP network. The media gateway 109 can conform to a media gateway control protocol (MGCP) also known as H.248 defined by work groups in the Internet Engineering Task Force (IETF). This protocol can handle signaling and session management needed during a multimedia conference. The protocol defines a means of communication which converts data from the format required for a circuit-switched network to that required for a packet-switched network. MGCP can therefore be used to set up, maintain, and terminate calls between multiple disparate network elements of the communication system 100. The media gateway 109 can therefore support hybrid communication environments for communication devices 116, including VoIP terminals.

The central office 106 can house common network switching equipment for distributing local and long-distance telecommunication services supplied by network 105 to buildings 112 (such as dwellings or commercial enterprises). Telecommunication services of the central office 106 can include traditional POTS (Plain Old Telephone Service) and broadband services such as HDTV, DSL, VoIP (Voice over Internet Protocol), IPTV (Internet Protocol Television), Internet services, and so on. The communication system 100 can utilize common computing and communications technologies to support circuit-switched and/or packet-switched communications.

The cellular network 113 can support voice and data services over a number of access technologies such as GSM-GPRS, EDGE, CDMA-1X, UMTS, WiMAX, software defined radio (SDR), and other known and future technologies. The cellular network 113 can be coupled to base stations 127 under a frequency-reuse plan for communicating over-the-air with roaming VoIP terminals 116.

Figure 2:
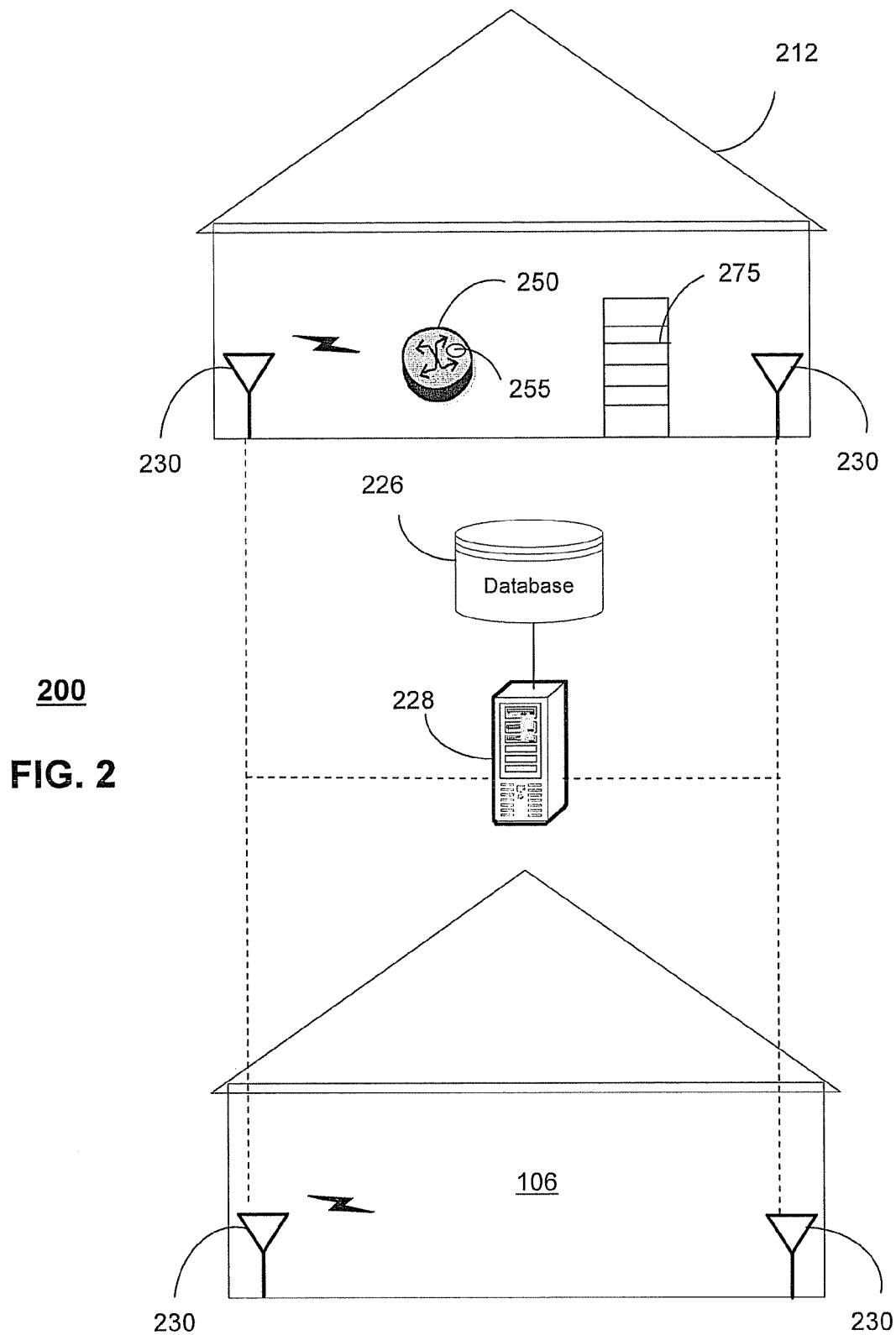
FIG. 2 depicts an illustrative embodiment of a monitoring system that is usable with one or more components of the communication system of FIG. 1.

FIG. 2 depicts an exemplary embodiment of a monitoring system 200 that can be utilized with one or more mobile plug-in devices or equipment 250. System 200 can be overlaid or operably coupled with communication system 100, such as being incorporated into a central office or other facility that stores or otherwise has plug-in equipment 250. System 200 can comprise a plurality of locations, illustrated in this exemplary embodiment as buildings 106 and 212. For example, building 212 can be a place of manufacture of the plug-in equipment, while building 106 can be the central office which may utilize the plug-in equipment 250, including as part of an electronics cabinet 275. Other locations are also contemplated by system 200, such as where it is desirable to store and/or distribute the mobile plug-in devices 250. The plug-in equipment 250 can be various mobile network components that can be incorporated into the network, such as servers, routers, DSLAMS, and so forth.

In one embodiment, a transmitter 255 of the network plug-in equipment 250 can transmit a digital code when it is coupled to, or otherwise being used by, the network. The digital code can include identification information and/or location information associated with the particular network plug-in equipment 250. The location information can be generated using a number of techniques. For example, components in proximity to the network plug-in equipment 250 having a known location can be utilized for generating the location information, including through polling and the like.

In another embodiment, the digital code can be transmitted via a hardwire link to a server 228 having a memory or database 226 for monitoring the location and use of the network plug-in equipment 250. The database 226 can store updateable information for each of the network plug-in equipment 250 so that the server can monitor the equipment throughout the network or designated portions thereof, including preventing unauthorized removal and/or use of the equipment.

The transmitter 255 can be a tag that is connected to the plug-in equipment 250 after manufacture of the equipment and/or the transmitter can be embedded in the equipment during manufacture. The transmitter 255 can be actuated to transmit the digital code in a number of different ways. For instance, the transmitter 255 can be actuated upon being powered up, rebooted, and/or polled by other components including the server 228. In one embodiment, the transmitter 255 can be self-actuated to transmit the digital code, such as according to a schedule.

Signaling devices 230, such as receivers, transmitters and/or transceivers, can be positioned at egress and ingress areas of the buildings 106 and 212. In one embodiment, the signaling device 230 can be a transceiver that excites a security signal from the network plug-in equipment 250. In another embodiment, the security signal can be transmitted by the transmitter 255. In yet another embodiment, the security signal can include the digital code for the network plug-in equipment 250 including the identification information and the location information. The particular components and techniques for transmitting the security signal from the network plug-in equipment 250 can vary. For instance, the security signal can be transmitted by RF signals, including passive and/or active RF devices. Other wireless technology can also be utilized including WiMAX, WiFi and so forth.

In one embodiment, the transceivers 230 can be RF transceivers that transmit RF signals for receipt by the plug-in equipment 250 that are passing or are in proximity thereto, where the RF transceivers have components, including integrated circuits and antennas, that provide for transmission of the RF signals at desired levels and/or desired intervals. In one embodiment, the RF transceivers 230 can repeatedly transmit the RF signals. The RF transceivers 230 can be positioned at various locations of buildings 106 and 212, such as at an entrance of the building. The strength or range of the RF signals can be set so that those network plug-in equipment devices 250 entering or leaving the building 106 and 212 receive the RF signal, but more remote equipment do not receive the RF signal.

In one embodiment, the transceivers 230 can receive the security signal from the network plug-in equipment 250 and provide it to the server 228. The database 226 can be updated with this information for each of the network plug-in equipment 250 so that the server 228 can monitor the equipment, including preventing unauthorized removal and/or use of the equipment. In another embodiment, the transmitters 255 can be used in combination with access signals, such as wireless signals from employee access or identification cards. For instance, in one exemplary embodiment, powering up a network plug-in device 250 can require use of an employee access card. The transmitters 255 can receive and transmit the employee access information with the digital code to the server 228.

In one embodiment, the transceivers 230 can receive wireless access signals, including signals transmitted from employee identification cards, and provide the signals to the server 228. The server 228 can maintain access information in combination with the plug-in equipment digital codes in order that individuals can be associated with removal and/or use of the equipment.

Figure 3:
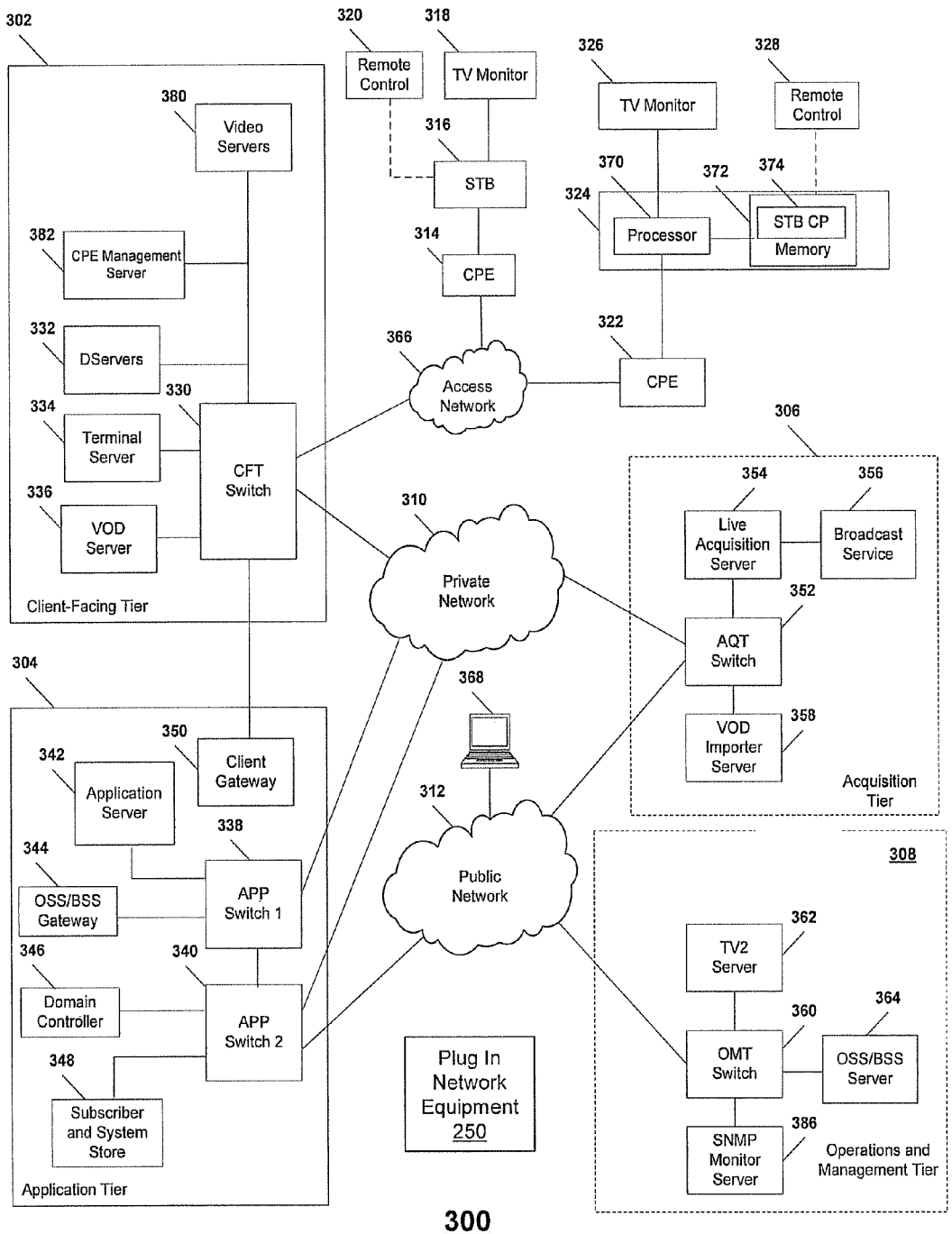
FIG. 3 depicts an illustrative embodiment of a communication system hat provides media service.

FIG. 3 depicts an illustrative embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 312.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, CPE 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an illustrative embodiment, the client-facing tier 302 can be coupled to the CPE 314, 322 via fiber optic cables. In another illustrative embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an illustrative, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a VoD server 336 that stores or provides VoD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VoD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stockkeeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VoD content at the client-facing tier 302. If the client gateway 350 cannot verify subscriber information for the set-top box device 316, such as because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VoD server 336 at the client-facing tier 302 via the private network 310. Additionally, at the acquisition tier 306, the VoD importer server 358 can receive content from one or more VoD sources outside the IPTV system 300, such as movie studios and programmers of non-live content. The VoD importer server 358 can transmit the VoD content to the AQT switch 352, and the AQT switch 352, in turn, can communicate the material to the CFT switch 330 via the private network 310. The VoD content can be stored at one or more servers, such as the VoD server 336.

When users issue requests for VoD content via the set-top box devices 316, 324, the requests can be transmitted over the access network 366 to the VoD server 336, via the CFT switch 330. Upon receiving such requests, the VoD server 336 can retrieve the requested VoD content and transmit the content to the set-top box devices 316, 324 across the access network 366, via the CFT switch 330. The set-top box devices 316, 324 can transmit the VoD content to the television monitors 318, 326. In an illustrative embodiment, video or audio portions of VoD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312. Communication system 300 can include one or more of the plug-in devices 250, such as portable network elements. The plug-in devices 250 can be removably coupled with various components of the communication system 300.

It should be apparent to one of ordinary skill in the art from the foregoing media communication system embodiments that other suitable media communication systems for distributing broadcast media content as well as peer-to-peer exchange of content can be applied to the present disclosure.

Figure 4:
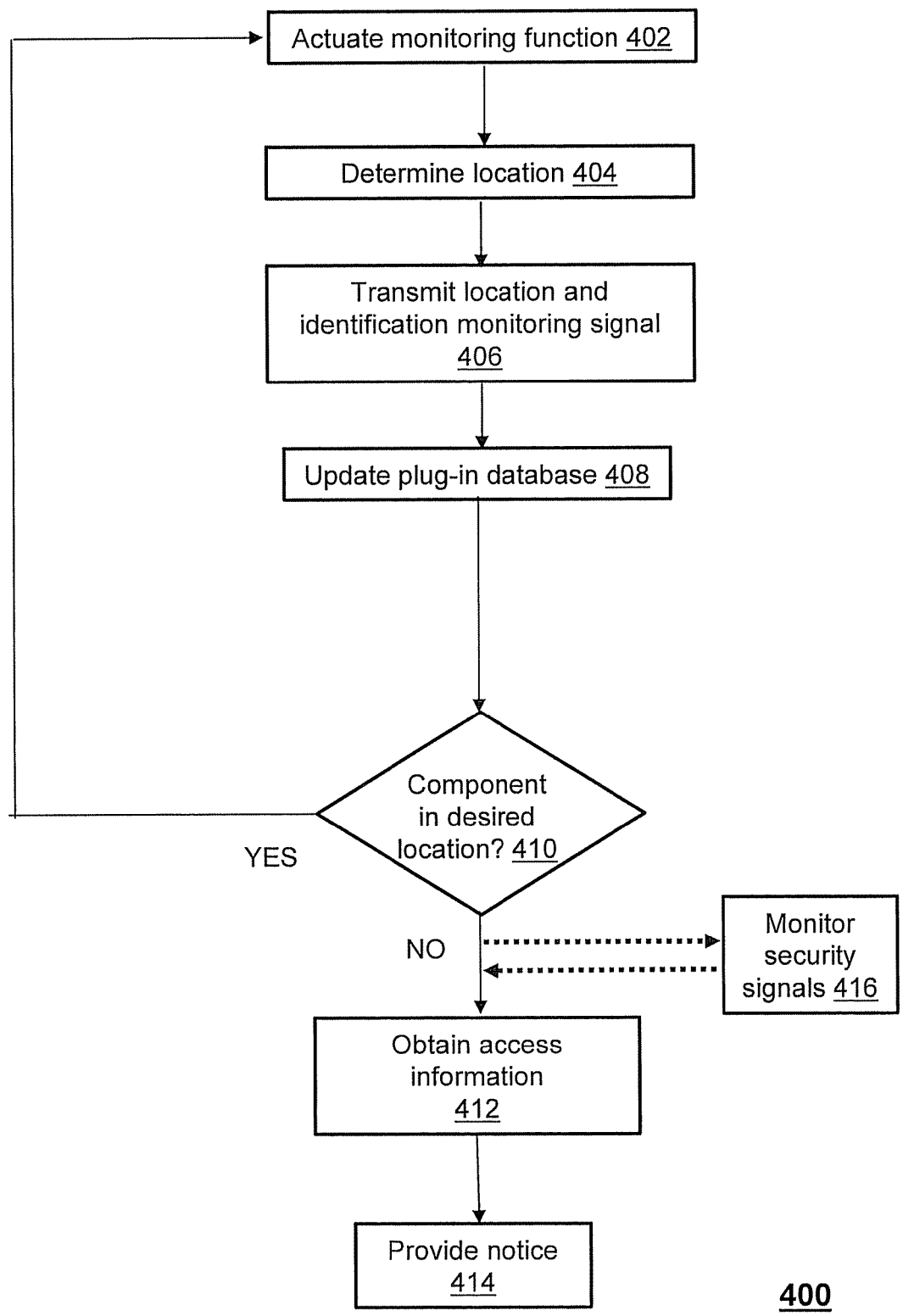
FIG. 4 depicts an illustrative embodiment of a method operating in portions of the communication systems of FIGS. 1 and 3 with the monitoring system of FIG. 2.

FIG. 4 depicts an exemplary method 400 operating in portions of one or more of the communication systems 100-300. Method 400 has variants as depicted by the dashed lines. It would be apparent to an artisan with ordinary skill in the art that other embodiments not depicted in FIG. 4 are possible without departing from the scope of the claims described below.

Method 400 can begin with step 402 where the monitoring function of the plug-in device 250 is actuated. The actuation can be performed in a number of ways, including based upon a particular event, such as powering on, rebooting, a schedule and so forth, and/or can be based on a request, such as being polled by the server 228. In one embodiment, coupling the plug-in equipment 250 with the network actuates the monitoring function.

In step 404, location information for the plug-in equipment 250 can be generated. In one embodiment, the location information can be generated by the plug-in equipment based on other components that are in proximity to the plug-in device, such as being coupled directly thereto, and which have a known location. In another embodiment, the location information can be provided to the plug-in device 250 by a server or other network element having a known location. For instance, a server located in a particular central office or remote electronics cabinet can transmit the location information of the central office or remote electronics cabinet upon detection that the plug-in equipment is positioned in proximity to the server. In another embodiment, the location information can be general location data, which is then processed, such as by the server 228, to determine a more exact location of the network plug-in device.

In step 406, a digital code comprising the location information and identification information associated with the plug-in device 250 can be transmitted to a monitoring device, such as server 228 and database 226. In one embodiment, the transmission can be performed over the network using a hard-wire link, however, the present disclosure contemplates using wireless communication for all or a portion of the path from the plug-in device 250 to the server 228. In step 408, the database 226 can be updated with the location information for the particular plug-in device 250 using the transmitted digital code.

In step 410, the server 228 can determine whether the plug-in device 250 is located in a desired location. This determination can be based on various information, such as a desired topology for the network or a portion thereof. In one embodiment, the desired topography can be a dynamic topography that is updated based on factors associated with the network, such as monitored traffic, equipment failures, planned build-outs and so forth. The topography can be determined by the server 228 and/or it can be determined by another processor and communicated to the server.

If the plug-in device 250 is located in its desired location then method 400 can return to step 402 for continued monitoring of the plug-in device, as well as other plug-in devices throughout the network. If on the other hand the plug-in device 250 is not located in the desired location, such as being located in an unauthorized location or not locatable then in step 412 access information associated with the plug-in device can be obtained. For example, access information generated from reading of employee access cards at the former and/or current locations can be obtained by the server 228.

In one embodiment, the access information can be retrieved from the transceivers 230 that allow for accessing facilities through out the network and that transmit the access information to the server 228. In another embodiment, the access information can be retrieved from the plug-in equipment 250 which transmits the access information along with the digital code comprising the identification and location information. For instance, the access information can be obtained by the plug-in device 250 when the access card is in proximity to the plug-in device and/or when the access card is utilized for implementing the plug-in device with the network. The former location of the plug-in device 250 can be the location immediately preceding the determination that the plug-in device is not in its desired location or can be previous locations.

In step 414, the server 228 can provide notice to a network administrator or other entity of the determination that the plug-in device 250 has been inappropriately positioned in the network or is otherwise unaccounted for. The network administrator can then take appropriate action for retrieving and repositioning the plug-in device 250, such as according to the desired topography of the network.

In one embodiment in step 416, security signals emitted from the plug-in equipment 250 can be monitored in conjunction with the use of the digital codes comprising the identification and location information, and/or the access information. For example, the security signals can be retrieved by the transceivers 230 upon the network plug-in device 250 passing in proximity to the transceiver. The security signals can be generated by the device 250 based on receipt of an interrogation signal from the transceiver 230. The security signals can be transmitted by the transceivers 230 to the server 228.

Upon reviewing the aforementioned embodiments, it would be evident to an artisan with ordinary skill in the art that said embodiments can be modified, reduced, or enhanced without departing from the scope and spirit of the claims described below. For example, the security signals can be monitored throughout the network using transceivers 230 positioned at facilities or other locations throughout the network so that the location of the plug-in device 250 at a new facility can be monitored even if it has not yet been coupled to the network. In one embodiment, the identification information, location information, access information and/or security signals can be transmitted by either or both of a hardwire link and a wireless link to the server 228. In another embodiment, the monitoring of the network plug-in device 250 can be a closed loop process.

In one embodiment, the entities that receive a notification of removal or repositioning of the plug-in device can depend on the information retrieved. For instance, if a plug-in device 250 is scheduled for repositioning to a local office or a remote electronics cabinet then the notification of connection at the new location and/or of disconnection at the central office can be transmitted as a normal distribution message to the appropriate personnel, while a notification of connection and/or disconnection of a plug-in device 250 that is not scheduled for repositioning can be transmitted to other personnel, such as a loss prevention. In another embodiment, the failure to receive a digital code comprising the identification and location information according to a schedule can be monitored by the server 228 and utilized in determining whether the plug-in device 250 is being removed or repositioned without authorization.

Other suitable modifications can be applied to the present disclosure without departing from the scope of the claims below. Accordingly, the reader is directed to the claims section for a fuller understanding of the breadth and scope of the present disclosure.

FIG. 5 depicts an illustrative diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected, such as using a network, to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502, such as a central processing unit (CPU), a graphics processing unit (GPU, or both, a main memory 504 and a static memory 506, which communicate with each other via a bus 508. The computer system 500 may further include a video display unit 510, such as a liquid crystal display (LCD), a flat panel, a solid state display, or a cathode ray tube (CRT). The computer system 500 may include an input device 512, such as a keyboard, a cursor control device 514, such as a mouse, a disk drive unit 516, a signal generation device 518, such as a speaker or remote control, and a network interface device 520.

The disk drive unit 516 may include a computer-readable medium 522 on which is stored one or more sets of instructions, such as software 524, embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the computer-readable medium 522 is shown in an example embodiment to be a single medium, the term "computer-readable medium" should be taken to include a single medium or multiple media, such as a centralized or distributed database, and/or associated caches and servers, that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission, such as TCP/IP, UDP/IP, HTML, HTTP represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory, machine-readable storage medium, comprising executable instructions, which responsive to being executed by a processor, cause the processor to perform operations comprising:
   receiving an actuation signal at a network plug-in device;
   obtaining location information associated with the network plug-in device based on receipt of the actuation signal;
   obtaining access information from an employee access card in proximity to the network plug-in device;
   transmitting a monitoring signal to a remote server from the network plug-in device according to a schedule, the monitoring signal comprising a digital code for the network plug-in device, the digital code comprising the location information and identification information associated with the network plug-in device, the remote server determining from a failure to receive the monitoring signal according to the schedule whether the network plug-in device is not locatable; and
   responsive to a determination by the remote server that the network plug-in device is not locatable:
      identifying access information obtained, by way of the network plug-in device, from the employee access card in proximity to the network plug-in device at a former location immediately preceding the determination that the network plug-in device is not locatable; and
      transmitting, from the network plug-in device, a security signal, wherein the security signal comprises the access information retrieved from the employee access card in proximity to the network plug-in device at the former location, and wherein the security signal enables the remote server to associate an employee identification determined from the access information with the determination that the network device is not locatable.

2. The non-transitory, machine-readable storage medium of claim 1, wherein the determination is made by the remote server responsive to failing to receive the monitoring signal, wherein the monitoring signal comprises location information.

3. The non-transitory, machine-readable storage medium of claim 1, wherein the location information is determined by the network plug-in device based on a network element in proximity to the network plug-in device having a known location.

4. The non-transitory, machine-readable storage medium of claim 1, wherein the operations further comprise requiring access information obtained from the employee access card upon power up of the network plug-in device.

5. The non-transitory, machine-readable storage medium of claim 1, wherein the monitoring signal is transmitted over a hardwire link between the network plug-in device and the remote server.

6. The non-transitory, machine-readable storage medium of claim 1, wherein the operations further comprise transmitting the security signal to the remote server based on receipt of the access information retrieved from the employee access card.

7. The non-transitory, machine-readable storage medium of claim 1, wherein the monitoring signal is transmitted by a transmitter that is removably connected to the network plug-in device.

8. The non-transitory, machine-readable storage medium of claim 4, wherein the operations further comprise generating a notification based on the monitoring signal, the security signal and the access information.

9. A server comprising:
   a memory that stores executable instructions; and
   a controller coupled to the memory, wherein the controller, responsive to executing the instructions, performs operations comprising:
      receiving a monitoring signal from a network plug-in device according to a schedule, the server determining a location of the network plug-in device, the monitoring signal comprising a digital code for the network plug-in device comprising location information and identification information associated with the network plug-in device, the location information being generated by the network plug-in device;

determining from a failure to receive the monitoring signal according to the schedule that the network plug-in device is not locatable;

responsive to the determining that the network plug-in device is not locatable:

identifying from a security signal comprising access information obtained, by way of the network plug-in device, an employee identification from an employee access card in proximity to the network plug-in device at a former location immediately preceding the determining that the network plug-in device is not locatable, wherein the security signal comprises access information retrieved by the network plug-in device from the employee access card in proximity to the network plug-in device at the former location; and associating the employee identification determined from the access information with the network plug-in device not being locatable.

10. The server of claim 9, wherein the operations further comprise receiving a security signal responsive to the network plug-in device requiring use of the employee access card upon power up of the network plug-in device.

11. The server of claim 10, wherein the operations further comprise generating a notification based on the monitoring signal, the access information and the security signal.

12. The server of claim 9, wherein the operations further comprise transmitting the monitoring signal wirelessly.

13. The server of claim 9, wherein the monitoring signal is transmitted by a transmitter that is removably connected to the network plug-in device.

14. The server of claim 9, wherein the operations further comprise:

updating a topology of at least a portion of a network resulting in an updated topology; and determining the former location based in part on the updated topology.

15. A server comprising:

a memory that stores executable instructions; and a controller coupled to the memory, wherein the controller, responsive to executing the instructions, performs operations comprising:

receiving a monitoring signal from a network plug-in device according to a schedule, the server determining a location of the network plug-in device, the monitoring signal comprising a digital code for the network plug-in device comprising location and identification information associated with the network plug-in device, the server being remote from the network plug-in device, wherein the network plug-in device is part of a communication link between first and second user devices;

determining from a failure to receive the monitoring signal according to the schedule that the network plug-in device is not locatable; and responsive to the determining that the network plug-in device is not locatable:

identifying from a security signal comprising access information obtained, by way of the network plug-in device, an employee identification from an employee access card in proximity to the network plug-in device at a former location immediately preceding the determining that the network plug-in device is not locatable, wherein the security signal comprises the access information retrieved from the employee access card in proximity to the network plug-in device at the former location; and associating the employee identification determined from the access information with the network plug-in device not being locatable.

16. The server of claim 15, wherein the operations further comprise receiving access information associated with an individual in proximity to the network plug-in device.

17. The server of claim 15, wherein the operations further comprise:

receiving a security signal when the network plug-in device is within a pre-determined distance of a security device; and determining whether the network plug-in device is not locatable based in part on the security signal.

18. The server of claim 15, wherein the monitoring signal is transmitted over a hardwire link between the network plug-in device and the server.

19. A network plug-in device comprising:

a memory that stores executable instructions; and a controller coupled to the memory, wherein the controller, responsive to executing the instructions, performs operations comprising:

generating location information associated with the network plug-in device based on receipt of an actuation signal;

transmitting according to a schedule a monitoring signal to a remote server, the remote server determining a location of the network plug-in device, the monitoring signal comprising a digital code for the network plug-in device comprising the location information and identification information associated with the network plug-in device; and responsive to a determination by the remote server from a failure to receive the monitoring signal according to the schedule that the network plug-in device is not locatable:

identifying access information obtained by the network plug-in device from an employee access card in proximity to the network plug-in device at a former location of the network plug-in device, immediately preceding the determination that the network plug-in device is not locatable; and transmitting a security signal, wherein the security signal comprises the access information retrieved from the employee access card in proximity to the network plug-in device at the former location of the network plug-in device.

20. The device of claim 19, wherein the operations further comprise accessing information associated with an individual in proximity to the network plug-in device; and transmit the access information to the remote server.

21. The device of claim 19, wherein the controller is removably connected with the network plug-in device.

22. The device of claim 19, wherein the operations further comprise transmitting the security signal in response to receiving an interrogation signal.

23. A method, comprising:

obtaining, by a network plug-in device comprising a processor, location information associated with the network plug-in device;

transmitting, by the network plug-in device, a monitoring signal to a server according to a schedule, the server determining a location status of the network plug-in device, the monitoring signal comprising a digital code for the network plug-in device comprising the location information and identification information associated with the network plug-in device; and responsive to the server failing to receive the monitoring signal according to the schedule, determining that the network plug-in device is not locatable:

identifying access information obtained, by way of the network plug-in device, from an employee access card in proximity to the network plug-in device at a former location of the network plug-in device immediately preceding the location status indicating that the network plug-in device is not locatable; and transmitting, by the network plug-in device, to the server a security signal comprising access information, the security signal being transmitted upon obtaining the access information, the access information enabling the server to associate the network plug-in device not being locatable with an identification of an individual determined from the access information at the former location of the network plug-in device.

24. The method of claim 23, wherein the determination that network plug-in device is not locatable is based on a signal from a group consisting of the monitoring signal, the access information, the security signal and combinations thereof.

25. The method of claim 23, further comprising:
updating a topology of the network to a predetermined topology; and
determining the former location based on the predetermined topology.

\* \* \* \* \*